United States Patent
Mizuguchi

(10) Patent No.: US 7,195,516 B2
(45) Date of Patent: Mar. 27, 2007

(54) BATTERY HOUSING STRUCTURE AND PORTABLE ELECTRONIC APPARATUS

(75) Inventor: Kazunari Mizuguchi, Toyokawa (JP)

(73) Assignee: Konica Minolta Sensing, Inc., Osaka (JP)

( * ) Notice: Subject to any disclaimer, the term of this patent is extended or adjusted under 35 U.S.C. 154(b) by 7 days.

(21) Appl. No.: 11/370,129

(22) Filed: Mar. 7, 2006

(65) Prior Publication Data
US 2006/0211297 A1 Sep. 21, 2006

(30) Foreign Application Priority Data
Mar. 17, 2005 (JP) ............................. 2005-077450

(51) Int. Cl.
*H01R 3/00* (2006.01)
(52) U.S. Cl. ..................................... 439/500
(58) Field of Classification Search ................ 439/500, 439/929, 188; 200/51.1; 455/566, 572, 455/407.1; 429/1, 96, 100
See application file for complete search history.

(56) References Cited

U.S. PATENT DOCUMENTS

| | | | |
|---|---|---|---|
| 6,117,575 A * | 9/2000 | Dinsdale | 429/1 |
| 6,994,576 B1 * | 2/2006 | Tanaka et al. | 439/188 |
| 7,054,670 B1 * | 5/2006 | Wang et al. | 455/566 |
| 2006/0128208 A1 * | 6/2006 | Huang | 439/500 |

FOREIGN PATENT DOCUMENTS

| | | |
|---|---|---|
| JP | 10-90770 A | 4/1998 |
| JP | 2978767 B2 | 9/1999 |
| JP | 2004-179120 A | 6/2004 |

* cited by examiner

*Primary Examiner*—J. F. Duverne
(74) *Attorney, Agent, or Firm*—Sidley Austin LLP

(57) ABSTRACT

The battery housing structure having the battery cavity for housing the battery and the battery cavity lid for closing the opening of the battery cavity, is provided with: the pushing portion for pushing the battery housed in the battery cavity toward the battery cavity lid; the supporting member that supports the battery cavity lid so as to be pivotable about the shaft substantially parallel to the pushing direction of the pushing portion; the battery armature that is provided on the battery cavity lid and is in contact with the electrode of the battery housed in the battery cavity; the slanting part provided on the side, of the battery armature, that comes into contact with the electrode of the battery first when the battery cavity lid is pivoted from the position to open the battery cavity to the position to close the battery cavity. The battery armature pivots while pushing the battery housed in the battery cavity in the direction of the pushing portion. Consequently, the battery cavity lid is easily opened and closed, the battery cavity lid is never lost and the contact resistance of the electrode of the battery can be reduced.

6 Claims, 9 Drawing Sheets

BATTERY HOUSING STRUCTURE AND PORTABLE ELECTRONIC APPARATUS

This application is based on Japanese Patent Application No. 2005-077450 filed in Japan on 17 Mar. 2005, the entire content of which is hereby incorporated by reference.

FIELD OF THE INVENTION

The present invention relates to a battery housing structure and a portable electronic apparatus, and more particularly, to a battery housing structure for electronic apparatuses having a rotary battery cavity lid, and a portable electronic apparatus.

DESCRIPTION OF RELATED ART

In some conventional battery housing structures for portable electronic apparatuses, the battery cavity lid is screwed so as not to come off due to a shock caused, for example, by dropping. However, according to this method, battery replacement takes time and is cumbersome, and there is a possibility that the battery cavity lid or a screw is lost at the time of battery replacement and this makes the apparatus no longer function as an apparatus.

Accordingly, as a structure in which the battery cavity lid is not screwed, Japanese Patent Gazette No. 2978767 discloses a structure in which the battery cavity lid is engaged by a different locking member.

Japanese Laid-Open Patent Application No. H10-90770 proposes a structure in which in order that the battery cavity lid is not lost, the battery cavity lid is made pivotable by a shaft provided on the body of the portable electronic apparatus so as not come off the body and the battery cavity lid is locked by a separately provided locking member.

Japanese Laid-Open Patent Application No. 2004-179120 proposes a structure in which in order to prolong the battery life and increase the operating time of the apparatus by reducing the contact resistance between the electrodes of the battery, when the locking mechanism of the battery cavity lid is slid to lock the lid, the battery armature is pressed in the anode direction of the battery by a protrusion provided on the locking mechanism to thereby reduce the contact resistance.

However, according to the structure of Japanese Patent Gazette No. 2978767, like the conventional screwing method, there is a possibility that the battery cavity lid is lost at the time of battery replacement. In addition, since the different locking member is necessary, the number of parts increases, which is disadvantageous to size reduction and cost reduction.

According to the structure of Japanese Laid-Open Patent Application No. H10-90770, since the separately provided locking member is necessary, the number of parts increases, which is disadvantageous to size reduction and cost reduction.

According to the structure of Japanese Laid-Open Patent Application No. 2004-179120, since it is necessary to press the battery armature against the battery when the locking mechanism is slid, it is necessary to slide the locking mechanism while pressing down the battery cavity lid, so that the apparatus is poor in operability and usability.

SUMMARY OF THE INVENTION

The present invention is made in view of the above-mentioned circumstances, and an object thereof is to provide a battery housing structure that is formed of one part without the addition of a new part and in which the battery cavity lid is never lost because it is attached to the apparatus body through a supporting member, the battery cavity lid is easily opened and closed, the contact resistance of the electrodes of the battery can be reduced and impact resistance is excellent, and a portable electronic apparatus having the battery housing structure.

The above-mentioned object is attained by providing the following structure:

A battery housing structure according to the present invention having a battery cavity for housing a battery and a battery cavity lid for closing an opening of the battery cavity, is provided with: pushing portion for pushing the battery housed in the battery cavity toward the battery cavity lid; a supporting member that supports the battery cavity lid so as to be pivotable about a shaft substantially parallel to a pushing direction of the pushing portion; a battery armature that is provided on the battery cavity lid and is in contact with an electrode of the battery housed in the battery cavity; a slanting part provided on a side, of the battery armature, that comes into contact with the electrode of the battery first when the battery cavity lid is pivoted from a position to open the battery cavity to a position to close the battery cavity. The battery armature pivots while pushing the battery housed in the battery cavity in a direction of the pushing portion.

According to this aspect of the invention, a battery housing structure can be provided that has a battery cavity lid in which since the battery cavity lid is closed while the battery is pressed in by the slanting part of the battery armature in the pushing direction while the battery cavity lid is pivoted along a guide plate, the battery cavity lid is easily opened and closed, the battery cavity lid is never lost and the contact resistance of the electrode of the battery can be reduced.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Hereinafter, embodiments of the present invention will be described with reference to the drawings.

Figure 1:
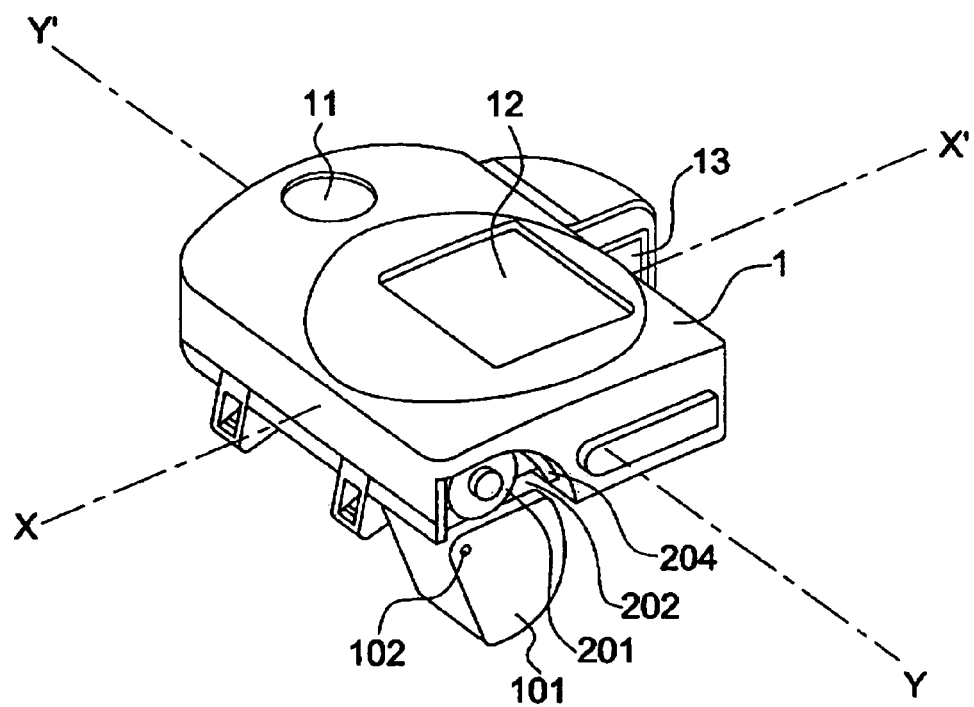
FIG. 1 is an external perspective view of a pulse oximeter that functions as the portable electronic apparatus according to the present invention.

FIG. 1 is an external perspective view of a pulse oximeter (oxygen saturation monitor) 1 that functions as the portable electronic apparatus according to the present invention.

A start button 11 for starting measurement and a display 12 for displaying the measurement result are provided on the top surface of the pulse oximeter 1.

A connector 13 to which a non-illustrated probe for measurement is connected is provided on the far side on a side surface of the pulse oximeter 1. By connecting a probe such as a finger clip probe to the connector 13, the arterial blood oxygen saturation and the pulse can be measured.

On the other hand, a battery cavity lid 101 is provided in front of a battery cavity 202 for housing a battery 201 on the near side on a side surface of the pulse oximeter 1. The battery cavity lid 101 is attached so as to be pivotable about a supporting member 102. A guide plate 204 for guiding the opening and closing of the battery cavity lid 101 to lock it in a closed position is provided on a side surface of the battery cavity 202.

Figure 2:
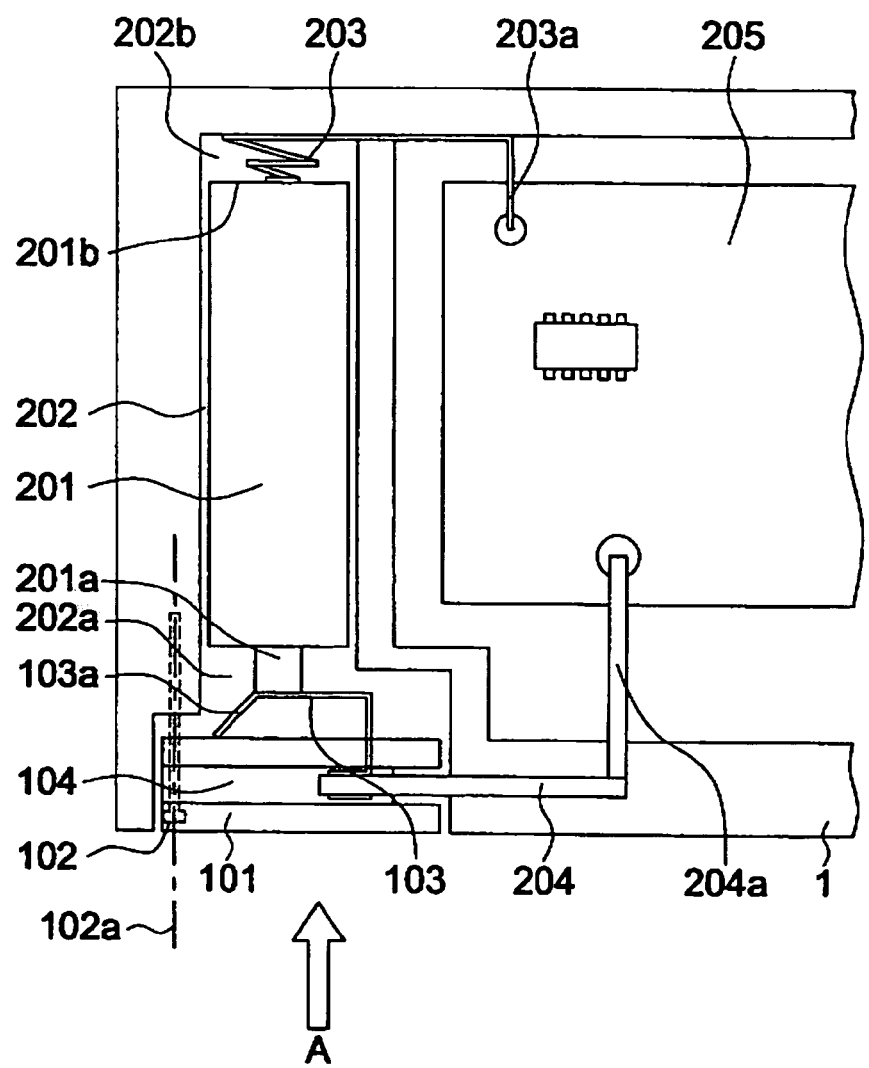
FIG. 2 is a schematic view showing the structure of a battery cavity and a battery cavity lid according to the first embodiment of the present invention.

Next, the battery housing structure according to a first embodiment of the present invention will be described with reference to FIGS. 2 to 5. FIG. 2 is a schematic view showing the structure of the battery cavity 202 and the battery cavity lid 101 according to the first embodiment of the present invention, and shows the cross section taken on a plane including the X–X' and Y–Y' axes of FIG. 1 which cross section is viewed from above. In this FIG. , the same parts as those of FIG. 1 are denoted by the same reference numerals.

Figure 3:
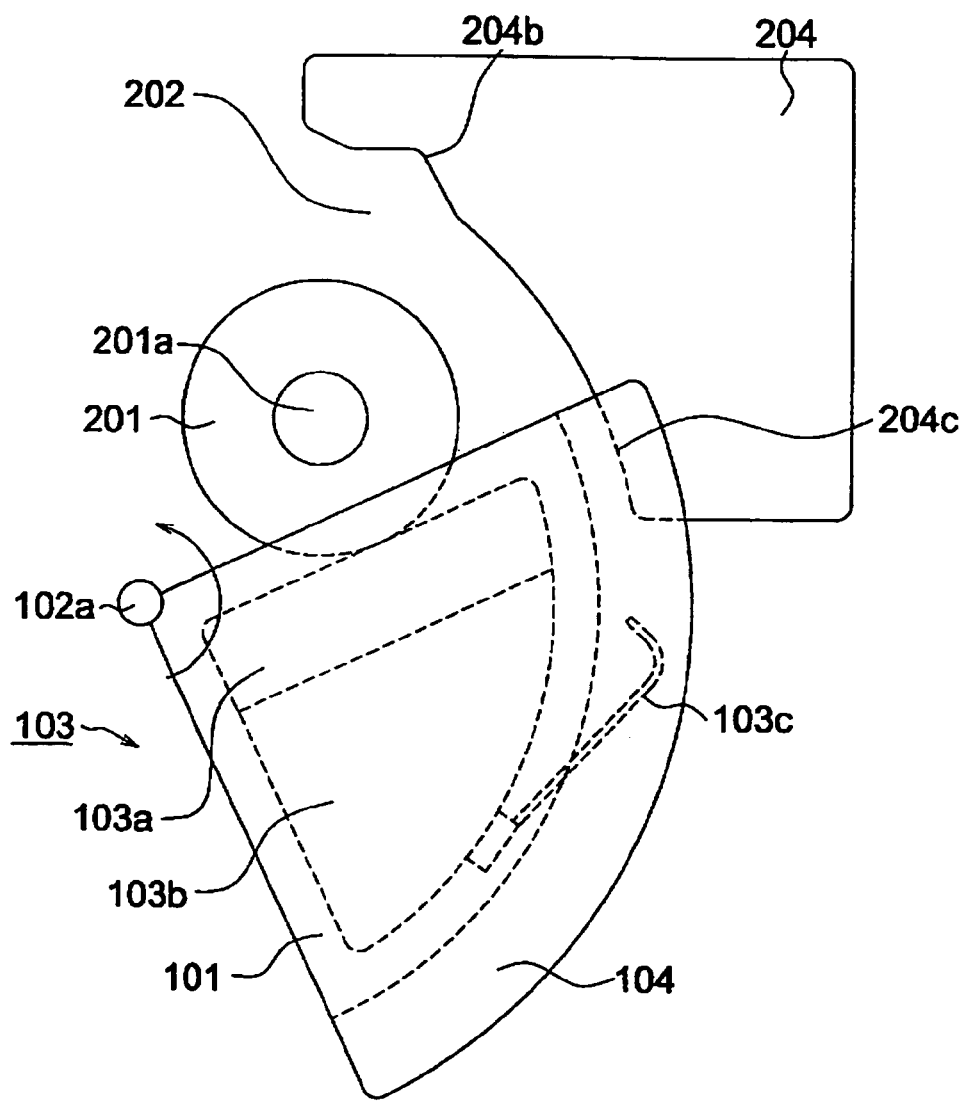
FIG. 3 is a schematic view, viewed from the direction A of FIG. 2, for showing the relationship among the battery cavity lid, a battery armature, a guide plate and a battery according to the first embodiment of the present invention, and shows a condition in which the battery cavity lid 101 starts to engage with the guide plate 204.
Figure 4:
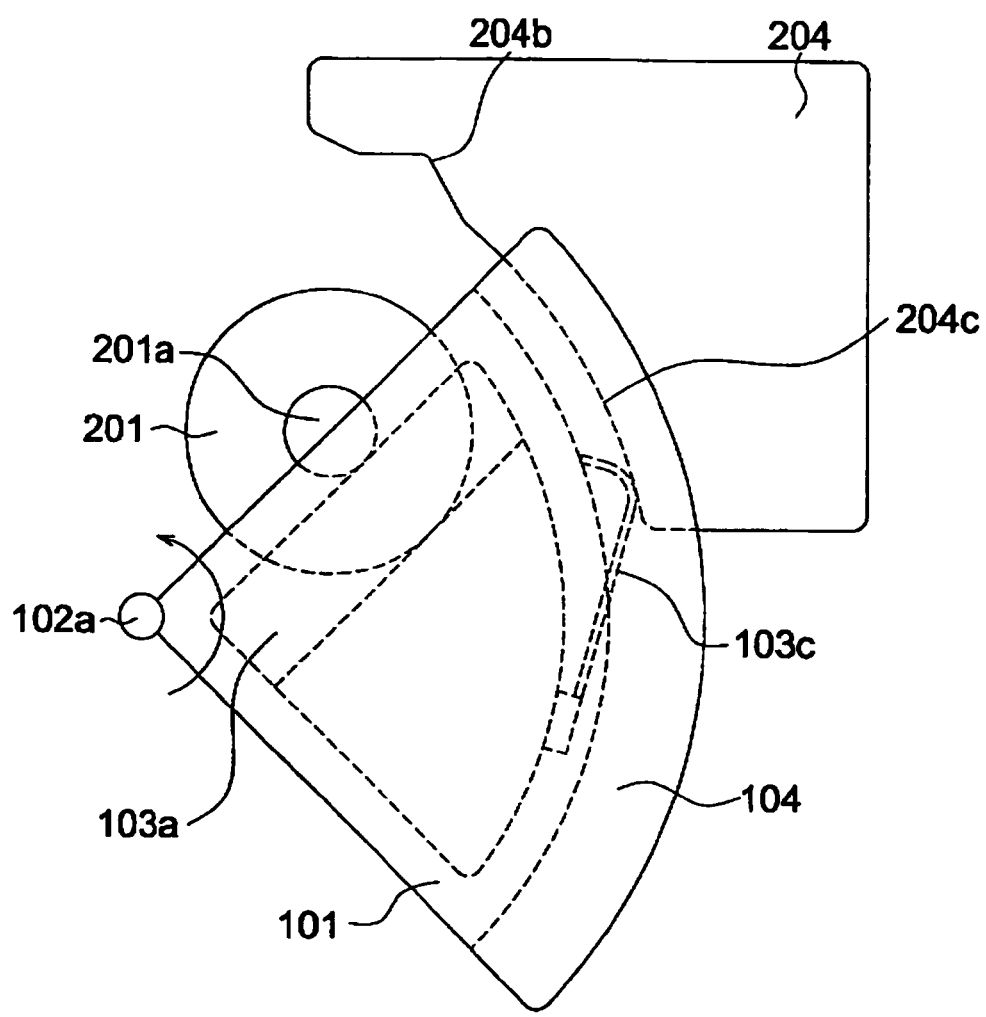
FIG. 4 is a schematic view, viewed from the direction A of FIG. 2, for showing the relationship among the battery cavity lid, the battery armature, the guide plate and the battery according to the first embodiment of the present invention, and shows a condition in which the battery armature 103 starts to come into contact with an anode 201a of the battery 201.
Figure 5:
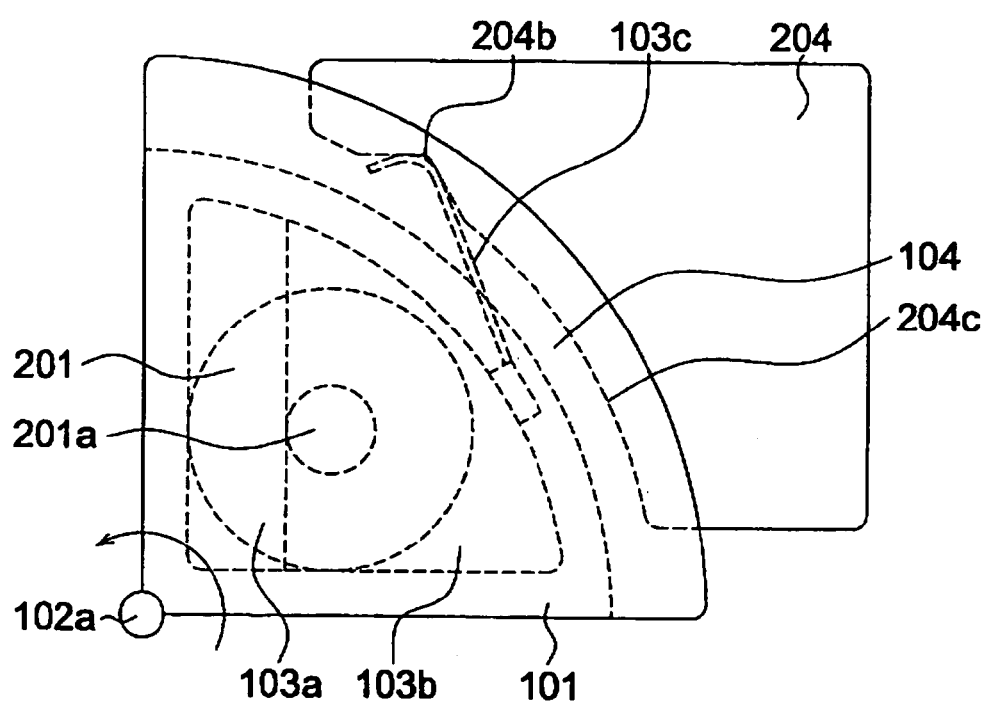
FIG. 5 is a schematic view, viewed from the direction A of FIG. 2, for showing the relationship among the battery cavity lid, a battery armature, a guide plate and a battery according to the first embodiment of the present invention, and shows a condition in which the battery cavity lid 101 is closed.

FIGS. 3 to 5 are schematic views, viewed from the direction A of FIG. 2, for showing the relationship among the battery cavity lid 101, a battery armature 103, the guide plate 204 and the battery 201 according to the first embodiment of the present invention. FIG. 3 shows a condition in which the battery cavity lid 101 starts to engage with the guide plate 204. FIG. 4 shows a condition in which the battery armature 103 starts to come into contact with an anode 201a of the battery 201. FIG. 5 shows a condition in which the battery cavity lid 101 is closed. In these figures, the same parts as those of FIGS. 1 and 2 are denoted by the same reference numerals. For ease of explanation, only relevant parts are shown and the remaining parts are not shown.

As shown in FIG. 2, the battery cavity 202 is provided in the body of the pulse oximeter 1 that functions as the portable electronic apparatus according to the present invention, and the battery 201 is inserted therein.

A pushing member 203 made of a metal and having conductivity and elasticity is provided in an innermost part 202b of the battery cavity 202. The pushing member 203 is electrically connected to a cathode 201b of the battery 201 by being elastically in contact therewith, and pushes the battery 201 toward an opening 202a. An end 203a of the pushing member 203 is electrically connected to an electric circuit 205 of the pulse oximeter 1 by soldering or the like. Thereby, the cathode 201b of the battery 201 is connected to the electric circuit 205 through the pushing member 203 to function as the negative-side power source of the electric circuit 205.

On the other hand, on the side of the opening 202a of the battery cavity 202, the battery cavity lid 101 made of plastic or the like is attached so as to be pivotable about a pivotal axis 102a by the supporting member 102 in a direction that closes or opens the opening 202a. The battery cavity lid 101 pivots from the far side to the near side of the figure to thereby close the opening 202a.

The battery cavity lid 101 is provided with the battery armature 103 made of a metal and having conductivity and elasticity, and is elastically in contact with the anode 201a of the battery 201 to thereby establish electric connection. A slanting part 103a is provided on a part of the battery armature 103 which part comes into contact with the anode 201a of the battery 201 first when the battery cavity lid 101 is closed.

The battery cavity lid 101 is provided with a pivot guide groove 104, and by the battery cavity lid 101 pivoting in the direction that closes the opening 202a, an end surface 204c of the guide plate 204 made of a metal and provided in the body of the pulse oximeter 1 engages with the pivot guide groove 104 so that the guide plate 204 can receive the forces acting on the battery cavity lid 101 in the pushing direction of the battery 201 by external forces due to the pushing force of the pushing member 203 or dropping. Moreover, as the battery cavity lid 101 pivots, the end 103c of the battery armature 103 and the end surface 204c of the guide plate 204 come elastically into contact with each other so as to be electrically connected to each other.

The end 204a of the guide plate 204 is electrically connected to the electric circuit 205 of the pulse oximeter 1 by soldering or the like. Thereby, the anode 201a of the battery 201 is connected to the electric circuit 205 through the battery armature 103 and the guide plate 204 to function as the positive-side power surface of the electric circuit 205.

Next, the shift from the open condition to the closed condition of the battery cavity lid 101 will be described step by step.

First, referring to FIG. 3, when the battery 201 is inserted in the battery cavity 202 with the anode 201a on the outer side and the battery cavity lid 101 is pivoted about the pivotal axis 102a (in the direction of the arrow in the figure) to start to close, the guide plate 204 engages with the pivot guide groove 104 provided on the battery cavity lid 101. At this point of time, the battery armature 103 is not in contact with the anode 201a of the battery 201.

Next, referring to FIG. 4, when the battery cavity lid 101 is further pivoted in the closing direction (the direction of the arrow in the FIG.) from the condition of FIG. 3, the slanting part 103a of the battery armature 103 starts to come into contact with the anode 201a of the battery 201. Since the slating part 103a of the battery armature 103 has an inclination angle with respect to the surface, in the pivot direction, of the battery cavity lid 101, after coming into contact with the anode 201a, the slanting part 103a presses in the anode 201a toward the battery cavity 202 (from the near side to the far side of the FIG.) against the pushing force, in the direction of the opening 202a, of the battery 201 so as to run on the anode 201a with the pivot of the battery cavity lid 101 about the pivotal axis 102a in the closing direction.

As the battery cavity lid 101 pivots, the end 103c of the battery armature 103 and the end surface 204c of the guide plate 204 come elastically into contact with each other, so that the end 103c slides on the end surface 204c as the battery cavity lid 101 pivots.

When the battery cavity lid 101 is further pivoted in the closing direction (the direction of the arrow in the FIG.) from the condition of FIG. 4 to be completely closed, as shown in FIG. 5, a flat part 103b of the battery armature 103 is elastically in contact with the anode 201a of the battery 201. Thereby, the flat part 103b and the anode 201a are in contact with each other with pressure applied in the pushing direction, so that the contact resistance can be reduced to maintain an electrically stable connection condition. For the pushing member 203 and the cathode 201b of the battery 201, the contact resistance can be similarly reduced to maintain an electrically stable connection condition.

On the other hand, the guide plate 204 is provided with a notch 204b. By the end 103c of the battery armature 103 engaging with the notch 204b as the battery cavity lid 101 pivots, locking in the pivot direction is established, and the battery armature 103 and the guide plate 204 serve also as the locking member for the battery cavity lid 101 so that the battery cavity lid 101 can be locked in the closed condition.

Further, in response to the closing of the battery cavity lid 101, the slanting part 103a and the flat part 103b of the battery armature 103 come into contact with and slide on the anode 201a of the battery 201, and the end 103c of the battery armature 103 comes into contact with and slides on the end surface 204c of the guide plate 204. By this sliding, so-called self-cleaning where the oxide films on the surfaces of the slating part 103a, the flat part 103b and the end 103c of the battery armature 103 are removed is made, so that the contact resistance can be reduced and consequently, the battery life can be prolonged. According to the present invention, since the closing and opening of the battery cavity lid is performed by the pivot about the pivotal axis 102a, the contact and sliding distance can be made long, so that the effect of the self-cleaning is high.

Figure 6:
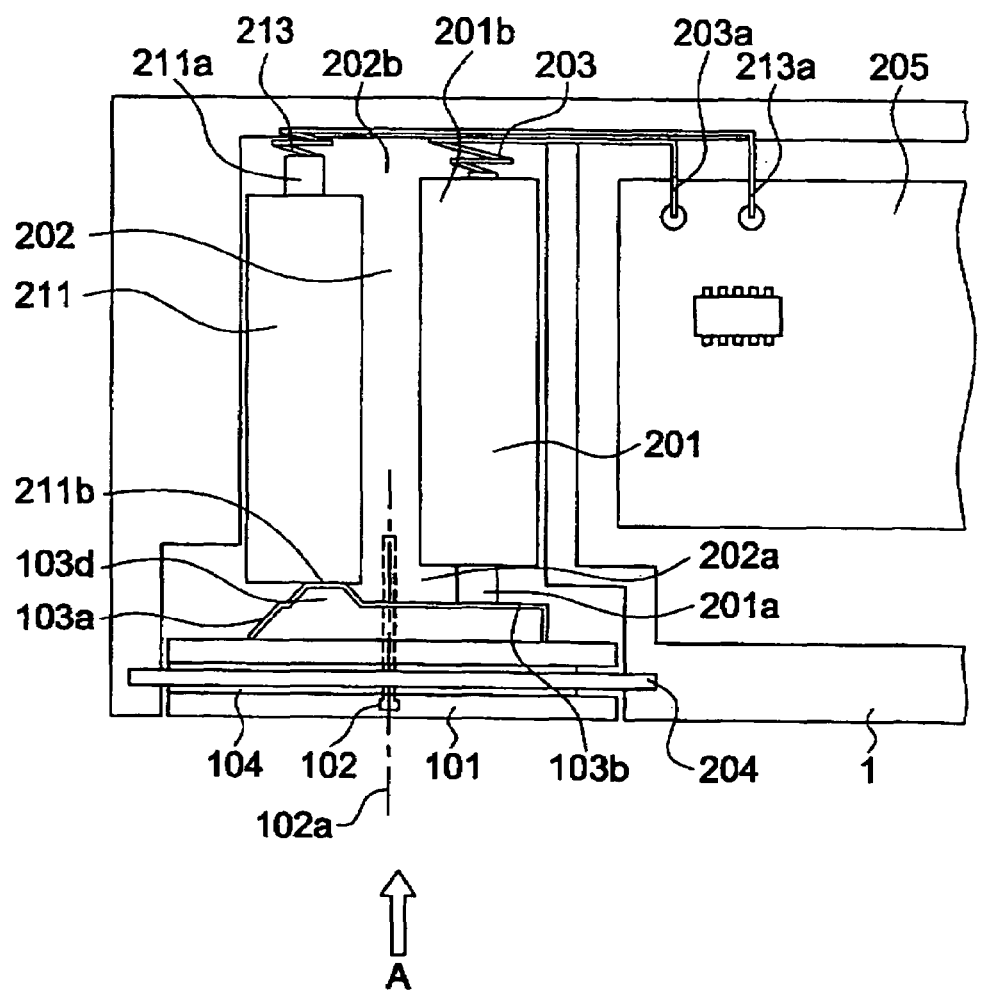
FIG. 6 is a schematic view showing the structure of a battery cavity and a battery cavity lid when a plurality of batteries are used according to a second embodiment of the present invention.

Next, the battery housing structure according to a second embodiment of the present invention will be described with reference to FIGS. 6 to 9. FIG. 6 is a schematic view showing the structure of a battery cavity and a battery cavity lid when a plurality of batteries are used according to the second embodiment of the present invention. In the FIG., the same parts as those of FIGS. 1 and 2 are denoted by the same reference numerals.

Figure 7:
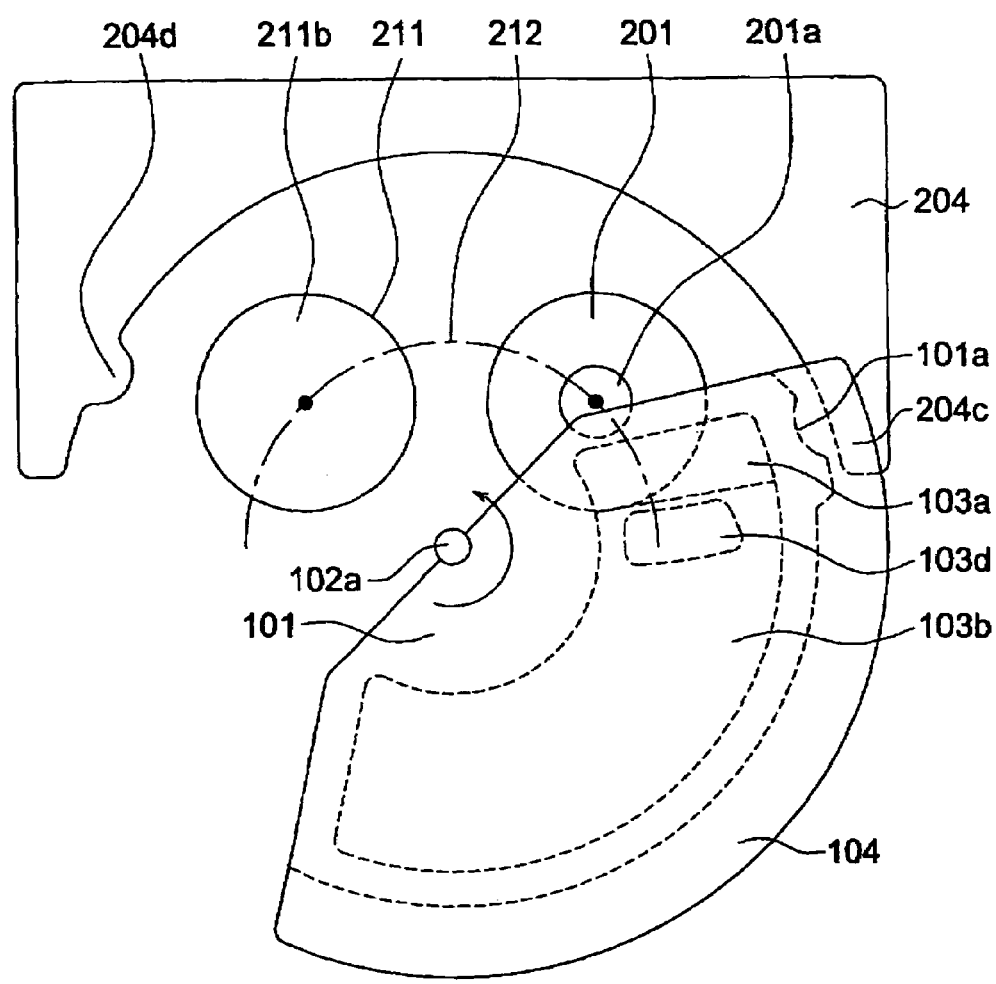
FIG. 7 is a schematic view, viewed from the direction A of FIG. 6, for showing the relationship among the battery cavity lid, the battery armature, the guide plate and two batteries according to the second embodiment of the present invention, and shows a condition in which the battery armature 103 starts to come into contact with the anode 201a of the battery 201.
Figure 8:
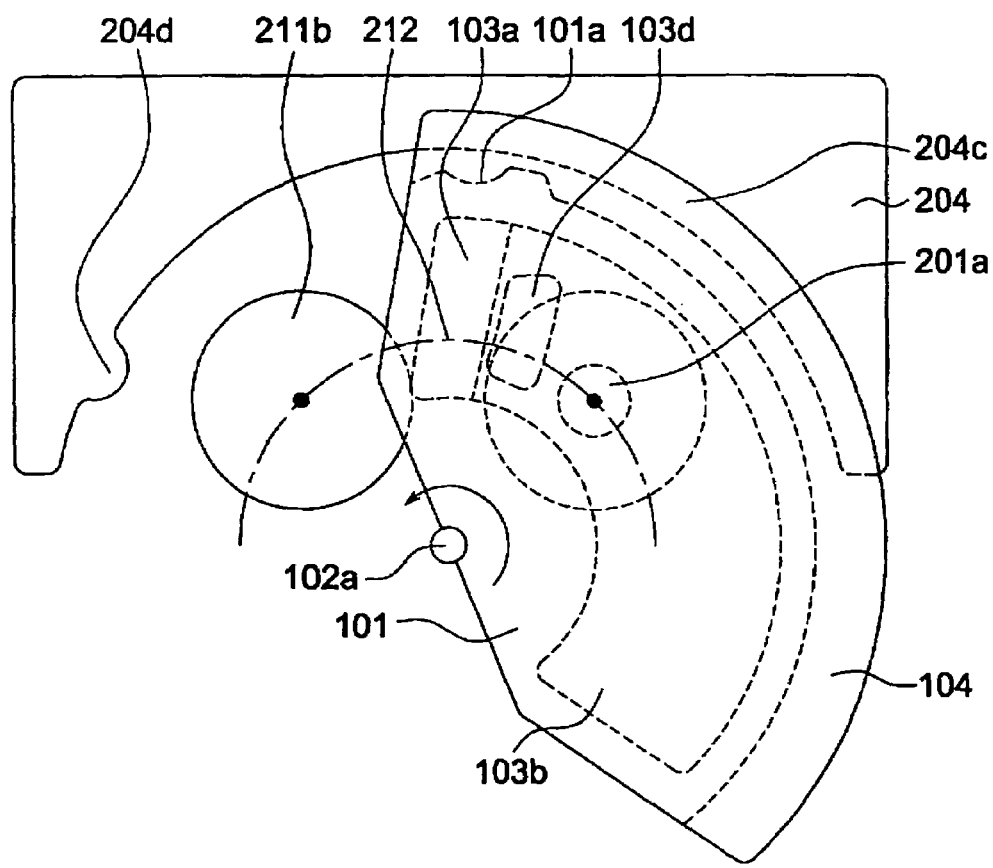
FIG. 8 is a schematic view, viewed from the direction A of FIG. 6, for showing the relationship among the battery cavity lid, the battery armature, the guide plate and the two batteries according to the second embodiment of the present invention, and shows a condition in which the battery armature 103 starts to come into contact with a cathode 211b of the battery 211.
Figure 9:
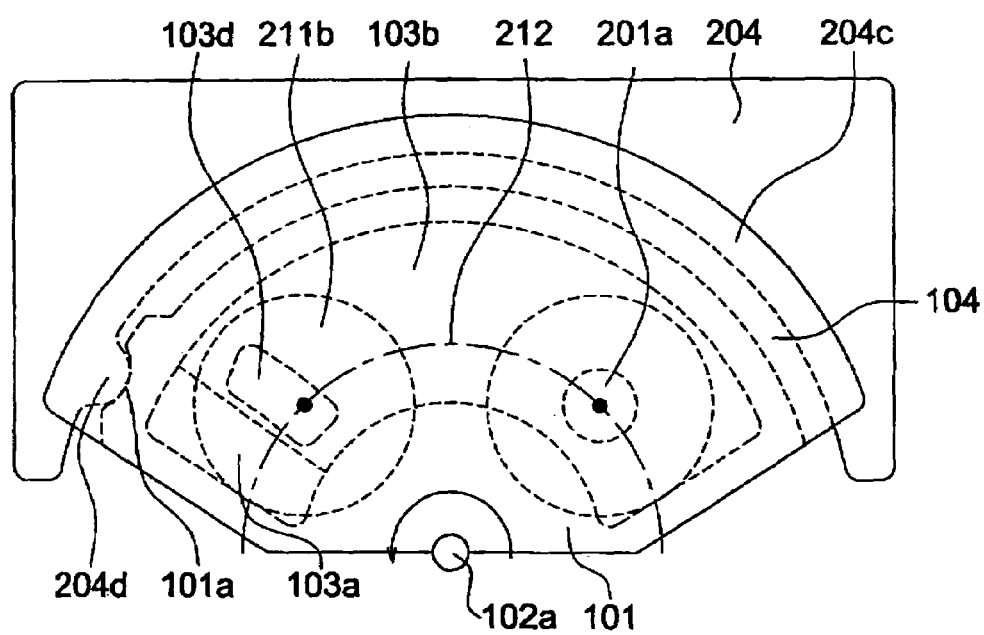
FIG. 9 is a schematic view, viewed from the direction A of FIG. 6, for showing the relationship among the battery cavity lid, the battery armature, the guide plate and the two batteries according to the second embodiment of the present invention, and shows a condition in which the battery cavity lid 101 is closed.

FIGS. 7 to 9 are schematic views, viewed from the direction A of FIG. 6, for showing the relationship among the battery cavity lid 101, the battery armature 103, the guide plate 204 and two batteries 201 and 211. FIG. 7 shows a condition in which the battery armature 103 starts to come into contact with the anode 201a of the battery 201. FIG. 8 shows a condition in which the battery armature 103 starts to come into contact with a cathode 211b of the battery 211. FIG. 9 shows a condition in which the battery cavity lid 101 is closed. In these FIGS., the same parts as those of FIGS. 1 to 5 are denoted by the same reference numerals. For ease of explanation, only relevant parts are shown and the remaining parts are not shown.

As shown in FIG. 6, the battery cavity 202 is provided in the body of the pulse oximeter 1 that functions as the portable electronic apparatus according to the present invention, and the batteries 201 and 211 are inserted therein. The batteries 201 and 211 are disposed so that their centers are situated on a substantial arc 212 with the pivotal axis 102a of the battery cavity lid 101 as the center.

While two batteries are used in the present embodiment, when three or more batteries are used, similarly, by disposing the batteries so that their centers are situated on the substantial are 212 with the pivotal axis 102a of the battery cavity lid 101 as the center, the slating part 103a of the battery armature 103 always presses in the batteries one by one as the battery cavity lid 101 pivots, so that the load on the battery armature 103 and the battery cavity lid 101 is light and stabilized.

Pushing members 203 and 213 made of a metal and having conductivity and elasticity are provided in the innermost part 202b of the battery cavity 202. The pushing member 203 is electrically connected to the cathode 201b of the battery 201 by being elastically in contact therewith, and pushes the battery 201 toward the opening 202a. The pushing member 213 is electrically connected to an anode 211a of the battery 211 by being elastically in contact therewith, and pushes the battery 211 toward the opening 202a.

The end 203a of the pushing member 203 is electrically connected to the electric circuit 205 of the pulse oximeter 1 by soldering or the like. Thereby, the cathode 201b of the battery 201 is connected to the electric circuit 205 through the pushing member 203 to function as the negative-side power source of the electric circuit 205. On the other hand, an end 213a of the pushing member 213 is electrically connected to the electric circuit 205 of the pulse oximeter 1 by soldering or the like. Thereby, the anode 201a of the battery 201 is connected to the electric circuit 205 through the pushing member 213 to function as the positive-side power source of the electric circuit 205.

On the other hand, on the side of the opening 202a of the battery cavity 202, the battery cavity lid 101 made of plastic or the like is attached so as to be pivotable about the pivotal axis 102a by the supporting member 102 in a direction that closes or opens the opening 202a. The battery cavity lid 101 pivots from the far side to the near side of the FIG. to thereby close the opening 202a.

The battery cavity lid 101 is provided with the battery armature 103 made of a metal and having conductivity and elasticity, and is elastically in contact with the anode 201a of the battery 201 and the cathode 211b of the battery 211 to thereby electrically connect the anode 201a of the battery 201 and the cathode 211b of the battery 211. The slanting part 103a is provided on a part of the battery armature 103 which part comes into contact with the anode 201a of the battery 201 first when the battery cavity lid 101 is closed. A concave part 103d is provided between the slanting part 301a and the flat part 103b of the battery armature 103 for contact with the cathode 211b of the battery 211.

The battery cavity lid 101 is provided with the pivot guide groove 104, and by the battery cavity lid 101 pivoting in the direction that closes the opening 202a, the end surface 204c of the guide plate 204 made of a metal, plastic or the like and provided in the body of the pulse oximeter 1 engages with the pivot guide groove 104 so that the guide plate 204 can receive the forces acting on the battery cavity lid 101 in the pushing direction of the batteries 201 and 211 by external forces due to the pushing force of the pushing member 203 or dropping.

Next, the shift from the open condition to the closed condition of the battery cavity lid 101 will be described step by step.

First, referring to FIG. 7, when the battery 201 is inserted in the battery cavity 202 with the anode 201a on the outer side, the battery 211 is inserted in the battery cavity 202 with the cathode 211b on the outer side and the battery cavity lid 101 is pivoted about the pivotal axis 102a (in the direction of the arrow in the figure) to start to close, first, the guide plate 204 engages with the pivot guide groove 104 provided on the battery cavity lid 101.

Then, when the battery cavity lid 101 is further pivoted in the closing direction (the direction of the arrow in the figure), the slanting part 103a of the battery armature 103 starts to come into contact with the anode 201a of the battery 201. Since the slating part 103a of the battery armature 103 has an inclination angle with respect to the surface, in the pivot direction, of the battery cavity lid 101, after coming into contact with the anode 201a, the slanting part 103a presses in the anode 201a toward the battery cavity 202 (from the near side to the far side of the figure) against the pushing force, in the direction of the opening 202a, of the battery 201 so as to run on the anode 201a with the pivot of the battery cavity lid 101 about the pivotal axis 102a in the closing direction.

When the battery cavity lid 101 is further pivoted in the closing direction (the direction of the arrow in the figure), as shown in FIG. 8, the slanting part 103a and the convex part 103d of the battery armature 103 pass over the anode 201a of the battery 201, so that the flat part 103b and the anode 201a are in contact with each other. Thereafter, the slanting part 103a starts to come into contact with the cathode 211b of the battery 211. Since the slating part 103a has an inclination angle with respect to the surface, in the pivot direction, of the battery cavity lid 101, after coming into contact, the slanting part 103a presses in the cathode 211b toward the battery cavity 202 (from the near side to the far side of the FIG.) against the pushing force, in the direction of the opening 202a, of the battery 211 with the pivot of the battery cavity lid 101 about the pivotal axis 102a in the closing direction.

When the battery cavity lid 101 is further pivoted in the closing direction (the direction of the arrow in the FIG.) from the condition of FIG. 8 to be completely closed, as shown in FIG. 9, the flat part 103b of the battery armature 103 is elastically in contact with the anode 201a of the battery 201. Thereby, the flat part 103b and the anode 201a are in contact with each other with pressure applied in the pushing direction, so that the contact resistance can be reduced to maintain an electrically stable connection condition. For the pushing member 203 and the cathode 201b of the battery 201, the contact resistance can be similarly reduced to maintain an electrically stable connection condition.

On the other hand, the guide plate 204 is provided with a protrusion 204d. By the protrusion 204d engaging with a concave part 101a provided in the pivot guide groove 104 of the battery cavity lid 101, locking in the pivot direction is established, and the battery cavity lid 101 itself and the guide plate 204 serve also as the locking member for the battery cavity lid 101 so that the battery cavity lid 101 can be locked in the closed condition.

As described above, according to the present invention, the following can be provided: a battery housing structure in which there is no possibility that the battery cavity lid is lost because it is attached to the apparatus body through the supporting member, the battery cavity lid is excellent in operability because it can be easily opened and closed only by pivoting it, the number of parts can be reduced because a single part is used both as the guide plate and a wiring member, the contact resistance of the electrodes of the battery can be reduced, and impact resistance is excellent; and a portable electronic apparatus having the battery housing structure.

While a pulse oximeter is described as the portable electronic apparatus in the present embodiment, the present invention limited thereto. The present invention is applicable to any portable electronic apparatuses that have a battery housing portion such as digital cameras, digital video cameras and mobile telephones.

The detailed structures and detailed operations of the parts constituting the image taking apparatus according to the present invention are modifiable as appropriate without departing from the spirit of the present invention.

As described above, a battery housing structure according to the present invention having a battery cavity for housing a battery; a battery cavity lid for closing an opening of the battery cavity; a pushing portion for pushing the battery housed in the battery cavity toward the battery cavity lid; a supporting member that supports the battery cavity lid so as to be pivotable about a shaft substantially parallel to a pushing direction of the pushing portion; a battery armature that is provided on the battery cavity lid and is in contact with an electrode of the battery housed in the battery cavity; and a slanting part provided on a side, of the battery armature, that comes into contact with the electrode of the battery first when the battery cavity lid is pivoted from a position to open the battery cavity to a position to close the battery cavity; wherein the battery armature pivots while pushing the battery housed in the battery cavity in a direction of the pushing portion.

According to this aspect of the invention, a battery housing structure can be provided that has a battery cavity lid in which since the battery cavity lid is closed while the battery is pressed in by the slanting part of the battery armature in the pushing direction while the battery cavity lid is pivoted along a guide plate, the battery cavity lid is easily opened and closed, the battery cavity lid is never lost and the contact resistance of the electrode of the battery can be reduced.

Preferably, in the above-described battery housing structure, the following are provided: a guide plate that restricts a pivot direction of the battery cavity lid; and a pivot guide groove provided on the battery cavity lid and parallel to a surface, in the pivot direction, of the battery cavity lid. By the battery cavity lid pivoting from the position to open the battery cavity to the position to close the battery cavity, the guide plate engages with the pivot guide groove, and thereafter, the slanting part of the battery armature comes into contact with the electrode of the battery.

According to this aspect of the invention, a battery housing structure can be provided that has a battery cavity lid in which since the guide plate engages with the pivot guide groove of the battery cavity lid in the initial stage of the closing of the battery cavity lid and thereafter, the battery armature comes into contact with the electrode of the battery to press in the battery in the pushing direction, only by pivoting the battery cavity lid, the battery cavity lid can be closed while the battery is pressed in in the pushing direction, the battery cavity can be smoothly opened and closed and the contact resistance of the electrode of the battery can be reduced.

Preferably, in the above-described battery housing structure, the guide plate functions as a locking member that fixes the battery cavity lid in the position that closes the battery cavity, and by a part of the battery armature coming elastically into contact with the guide plate when the battery cavity lid is pivoted from the position to open the battery cavity to the position to close the battery cavity, electric connection to an electric circuit is established through the guide plate.

Preferably, in the above-described battery housing structure, a guide plate is provided that restricts a pivot direction of the battery cavity lid and functions as a locking member that fixes the battery cavity lid in the position that closes the battery cavity, and by a part of the battery armature coming elastically into contact with the guide plate when the battery cavity lid is pivoted from the position to open the battery cavity to the position to close the battery cavity, electric connection to an electric circuit is established through the guide plate.

According to these aspects of the invention, a battery housing structure can be provided that has a battery cavity lid in which by using the guide plate as both the battery cavity lid locking member and the energizing member, it is unnecessary to add a new part, the battery cavity lid is easily opened and closed, impact resistance is excellent and the contact resistance between the battery armature and the guide plate can be reduced.

Preferably, in the above-described battery housing structure, the battery cavity is capable of housing a plurality of batteries, and the batteries are disposed on a substantial arc with the supporting member as a center.

According to this aspect of the invention, when a plurality of batteries are housed in the battery cavity, by disposing the batteries on a substantial are with the supporting member of the battery cavity lid as the center, the batteries can be pressed in one by one in the pushing direction by the slanting part of the battery armature when the battery cavity lid is closed, and for this reason, not a strong power is required to push the batteries, so that a battery housing structure having a battery cavity lid excellent in operability can be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A battery housing structure, comprising:
   a battery cavity for housing a battery;
   a battery cavity lid for closing an opening of the battery cavity;
   a pushing portion for pushing the battery housed in the battery cavity toward the battery cavity lid;
   a supporting member that supports the battery cavity lid so as to be pivotable about a shaft substantially parallel to a pushing direction of the pushing portion;
   a battery armature that is provided on the battery cavity lid and is in contact with an electrode of the battery housed in the battery cavity; and
   a slanting part provided on a side, of the battery armature, that comes into contact with the electrode of the battery first when the battery cavity lid is pivoted from a position to open the battery cavity to a position to close the battery cavity;
   wherein the battery armature pivots while pushing the battery housed in the battery cavity in a direction of the pushing portion.

2. A battery housing structure as claimed in claim 1, further comprising:
   a guide plate that restricts a pivot direction of the battery cavity lid; and
   a pivot guide groove provided on the battery cavity lid and parallel to a surface, in the pivot direction, of the battery cavity lid;
   wherein by the battery cavity lid pivoting from the position to open the battery cavity to the position to close the battery cavity, the guide plate engages with the pivot guide groove, and thereafter, the slanting part of the battery armature comes into contact with the electrode of the battery.

3. A battery housing structure as claimed in claim 2,
   wherein the guide plate functions as a locking member that fixes the battery cavity lid in the position that closes the battery cavity, and by a part of the battery armature coming elastically into contact with the guide plate when the battery cavity lid is pivoted from the position to open the battery cavity to the position to close the battery cavity, electric connection to an electric circuit is established through the guide plate.

4. A battery housing structure as claimed in claim 1, further comprising:
   a guide plate is provided that restricts a pivot direction of the battery cavity lid and functions as a locking member that fixes the battery cavity lid in the position that closes the battery cavity,
   wherein by a part of the battery armature coming elastically into contact with the guide plate when the battery cavity lid is pivoted from the position to open the battery cavity to the position to close the battery cavity, electric connection to an electric circuit is established through the guide plate.

5. A battery housing structure as claimed in claim 1,
   wherein the battery cavity is capable of housing a plurality of batteries, and the batteries are disposed on a substantial are with the supporting member as a center.

6. A portable electronic apparatus, comprising:
   a function unit for executing electric function with electric power,
   a battery cavity for housing a battery to supply electric power to the function unit;
   a battery cavity lid for closing an opening of the battery cavity;
   a pushing portion for pushing the battery housed in the battery cavity toward the battery cavity lid;
   a supporting member that supports the battery cavity lid so as to be pivotable about a shaft substantially parallel to a pushing direction of the pushing portion;
   a battery armature that is provided on the battery cavity lid and is in contact with an electrode of the battery housed in the battery cavity; and
   a slanting part provided on a side, of the battery armature, that comes into contact with the electrode of the battery first when the battery cavity lid is pivoted from a position to open the battery cavity to a position to close the battery cavity;
   wherein the battery armature pivots while pushing the battery housed in the battery cavity in a direction of the pushing portion.

* * * * *